(12) United States Patent
Erdem et al.

(10) Patent No.: US 8,821,983 B2
(45) Date of Patent: Sep. 2, 2014

(54) ULTRA-HIGH SOLID CONTENT POLYURETHANE DISPERSION AND A CONTINUOUS PROCESS FOR PRODUCING ULTRA-HIGH SOLID CONTENT POLYURETHANE DISPERSIONS

(75) Inventors: Bedri Erdem, Midland, MI (US); Debkumar Bhattacharjee, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 199 days.

(21) Appl. No.: 12/519,831

(22) PCT Filed: Dec. 19, 2007

(86) PCT No.: PCT/US2007/088194
§ 371 (c)(1),
(2), (4) Date: Jun. 18, 2009

(87) PCT Pub. No.: WO2008/077118
PCT Pub. Date: Jun. 26, 2008

(65) Prior Publication Data
US 2010/0015341 A1    Jan. 21, 2010

Related U.S. Application Data

(60) Provisional application No. 60/875,656, filed on Dec. 19, 2006.

(51) Int. Cl.
| | |
|---|---|
| *B05D 3/02* | (2006.01) |
| *C08G 18/12* | (2006.01) |
| *C08G 18/32* | (2006.01) |
| *C08G 18/30* | (2006.01) |
| *C08G 18/28* | (2006.01) |
| *C08G 18/40* | (2006.01) |
| *C08G 18/42* | (2006.01) |
| *C08G 18/48* | (2006.01) |
| *C08G 18/62* | (2006.01) |

(52) U.S. Cl.
CPC ...... *C08G 18/12* (2013.01); *B05D 3/02* (2013.01); *C08G 18/3225* (2013.01); *C08G 18/302* (2013.01); *C08G 18/283* (2013.01); *C08G 18/4018* (2013.01); *C08G 18/4277* (2013.01); *C08G 18/4808* (2013.01); *C08G 18/4833* (2013.01); *C08G 18/4841* (2013.01); *C08G 18/6216* (2013.01); *C08G 2190/00* (2013.01); *C08G 2270/00* (2013.01)
USPC ............... 427/385.5; 521/65; 524/839

(58) Field of Classification Search
None
See application file for complete search history.

(56) References Cited

U.S. PATENT DOCUMENTS

| | | | |
|---|---|---|---|
| 4,130,523 A | 12/1978 | Hoy et al. | |
| 4,456,726 A | 6/1984 | Siol et al. | |
| 4,783,502 A | 11/1988 | Faler et al. | |
| 5,340,858 A | 8/1994 | Bauer et al. | |
| 5,340,859 A | 8/1994 | Aydin et al. | |
| 5,350,787 A | 9/1994 | Aydin et al. | |
| 5,426,146 A | 6/1995 | Aydin et al. | |
| 5,496,882 A | 3/1996 | Aydin et al. | |
| 5,498,655 A | 3/1996 | Aydin et al. | |
| 5,624,992 A | 4/1997 | Aydin et al. | |
| 5,759,695 A * | 6/1998 | Primeaux, II | 428/425.5 |
| 6,087,440 A | 7/2000 | Skaggs et al. | |
| 6,329,060 B1 * | 12/2001 | Barkac et al. | 428/423.1 |
| 2004/0116594 A1 * | 6/2004 | Bhattacharjee et al. | 524/589 |
| 2005/0004306 A1 * | 1/2005 | Lubnin et al. | 524/589 |
| 2006/0058445 A1 * | 3/2006 | Leuninger et al. | 524/500 |
| 2006/0128885 A1 | 6/2006 | Rische et al. | |
| 2009/0012230 A1 * | 1/2009 | Bedri et al. | 524/590 |
| 2011/0077345 A1 * | 3/2011 | Erdem et al. | 524/500 |
| 2011/0077348 A1 * | 3/2011 | Erdem et al. | 524/539 |
| 2011/0082236 A1 * | 4/2011 | Erdem et al. | 523/221 |

FOREIGN PATENT DOCUMENTS

GB      1 162 409      8/1969

OTHER PUBLICATIONS

Guyot, A., et al., High Solid Content Latexes, Progress in Polymer Science, 2002, pp. 1573-1615, vol. 27, Elsevier Science Ltd.

Schneider, M., et al., High Solids Content Emulsions. I. A Study of the Influence of the Particle Size Distribution and Polymer Concentration on Viscosity, Journal of Applied Polymer Science, 2002, pp. 1878-1896, vol. 84, Wiley Periodicals, Inc.

International Search Report (PCT/US2007/088194), Aug. 2008.

Horiba Instruments, Inc., "A Guide to Particle Size Analysis,", Horiba Scientific (2012), pp. 1-32.

Korean Office Action dated Apr. 21, 2014; from Korean counterpart Application No. 10-2009-7014941.

Instructions to Korean Office Action dated Jun. 23, 2014; from from Korean counterpart Application No. 10-2009-7014941.

\* cited by examiner

*Primary Examiner* — Erma Cameron (57) ABSTRACT

The instant invention is an ultra-high solid content polyurethane dispersion, and a continuous process for producing ultra-high solid content polyurethane dispersions. The ultra-high solid content polyurethane dispersion includes the reaction product of: (1) a first component, wherein the first component is a first polyurethane prepolymer or a first polyurethane prepolymer emulsion; (2) a second component, wherein the second component is a second polyurethane prepolymer, a second polyurethane prepolymer emulsion, a low solid content polyurethane dispersion, a seed latex, or combinations thereof; (3) and a chain extender. The ultra-high solid content polyurethane dispersion has a solid content of at least 60 percent by weight of the solid, based on the total weight of the ultra-high solid content polyurethane dispersion, and a viscosity in the range of less than 5000 cps at 20 rpm at 21° C. using spindle #4 with Brookfield viscometer. The method for producing a high-solid content polyurethane dispersion includes the following steps: (1) providing a first stream, wherein said first stream comprising a first polyurethane prepolymer or a first polyurethane prepolymer emulsion; (2) providing a second stream, wherein said second stream being a media phase selected from the group consisting of a second polyurethane prepolymer, a second polyurethane prepolymer emulsion, a polyurethane prepolymer dispersion, a seed latex emulsion, or combinations thereof; (3) continuously merging said first stream with said second stream in the presence of a chain extender; and (4) thereby forming a polyurethane dispersion having a solid content of at least 60 percent by weight of the solid, based on the total weight of the ultra-high solid content polyurethane dispersion, and a viscosity in the range of less than 5000 cps at 20 rpm at 21° C. using spindle #4 with Brookfield viscometer.

14 Claims, 3 Drawing Sheets

ULTRA-HIGH SOLID CONTENT POLYURETHANE DISPERSION AND A CONTINUOUS PROCESS FOR PRODUCING ULTRA-HIGH SOLID CONTENT POLYURETHANE DISPERSIONS

CROSS-REFERENCE TO RELATED APPLICATIONS

This application is a non-provisional application claiming priority from the U.S. Provisional Patent Application Ser. No. 60/875,656, filed on Dec. 19, 2006 entitled "An ultra-high solid content polyurethane dispersion and a continuous process for producing ultra-high solid content polyurethane dispersions," the teachings of which are incorporated herein as if reproduced in full hereinbelow.

FIELD OF INVENTION

The instant invention relates an ultra-high solid content polyurethane dispersion, and a continuous process for producing ultra-high solid content polyurethane dispersions.

BACKGROUND OF THE INVENTION

Inability to produce aqueous polyurethane dispersions with ultra-high solid contents prevents their performance in many different applications. Aqueous polyurethane dispersions with low solid contents result in unacceptable levels of shrinkage upon drying, inability to incorporate higher levels of fillers into final products, and requiring longer times to dry. In addition, ultra-high solid content polyurethane dispersions facilitate lower shipping and storage costs and production reduction time per unit volume of materials.

U.S. Pat. No. 4,130,523 discloses aqueous polymer latexes produced by a process in which a portion of a forming latex in a reaction zone is continuously withdrawn from the reaction zone during formation of a stable seed latex and an intermediate latex, and the withdrawn latex is continuously fed back to the reaction zone during the formation of the final latex.

U.S. Pat. No. 4,456,726 discloses the method of making highly concentrated, bimodal, aqueous synthetic resin dispersions by the emulsion polymerization of ethylenically unsaturated monomers, in the presence of emulsifiers and free radical-forming initiators, by adding to a first latex containing a first dispersed synthetic resin and an aqueous phase, a second latex containing a second dispersed synthetic resin and an aqueous phase and a monomer phase containing a free-radically polymerizable monomer, and then polymerizing the monomer, the average size of the particles of said first resin differing by a factor between 2 and 15 from that of the particles of second resin, the total weight of the resins and monomers representing 100 parts by weight, and the total weight of the aqueous phases representing not more than 70 parts by weight.

U.S. Pat. No. 5,340,858 discloses final aqueous polymer dispersions that are obtainable by polymerizing radical polymerizable monomers with the addition of an aqueous dispersion of a starting polymer by the method of free radical aqueous emulsion polymerization.

U.S. Pat. No. 5,340,859 discloses an aqueous polymer dispersion which is obtainable by polymerizing monomers by the method of free radical aqueous emulsion polymerization with the addition of at least two starting polymer dispersions, of which one contains not only particularly finely divided but also coarsely divided polymer particles.

U.S. Pat. No. 5,350,787 discloses an aqueous polymer dispersion which is obtainable by polymerizing at least one radical polymerizable monomer by the method of free radical aqueous emulsion polymerization with the addition of an aqueous dispersion of a starting polymer.

U.S. Pat. No. 5,426,146 discloses an aqueous polymer dispersion which is obtainable by polymerizing radical polymerizable monomers other than vinyl or vinylidene halides by the method of free radical aqueous emulsion polymerization with the addition of an aqueous starting polymer dispersion having a certain diameter distribution of the starting polymer particles present therein by the stream addition process.

U.S. Pat. No. 5,496,882 discloses an aqueous polymer dispersion which is obtainable by polymerizing at least one radical polymerizable monomer by the method of free radical aqueous emulsion polymerization with the addition of an aqueous dispersion of a starting polymer.

U.S. Pat. No. 5,498,655 discloses an aqueous polymer dispersion which is obtainable by polymerizing radical polymerizable monomers other than vinyl or vinylidene halides by the method of free radical aqueous emulsion polymerization with the addition of an aqueous starting polymer dispersion having a certain diameter distribution of the starting polymer particles present therein by the stream addition process.

U.S. Pat. No. 5,624,992 discloses an aqueous polymer dispersion which is obtainable by polymerizing monomers by the method of free radical aqueous emulsion polymerization with the addition of at least one fine and at least one coarse aqueous starting polymer dispersion.

Despite the research efforts in developing ultra-high solid content polyurethane dispersions, there is still a need for ultra-high solid content polyurethane dispersions that provide reduced shrinkage upon drying, facilitate loading of additional fillers, and requiring relatively lesser amounts of time to dry. Furthermore, there is a need for a continuous process to make ultra-high solid content polyurethane dispersions that provide reduced shrinkage upon drying, facilitate loading of additional fillers, and requiring relatively lesser amounts of time to dry.

SUMMARY OF THE INVENTION

The instant invention is an ultra-high solid content polyurethane dispersion, and a continuous process for producing ultra-high solid content polyurethane dispersions. The ultra-high solid content polyurethane dispersion includes the reaction product of: (1) a first component, wherein the first component is a first polyurethane prepolymer or a first polyurethane prepolymer emulsion; (2) a second component, wherein the second component is a second polyurethane prepolymer, a second polyurethane prepolymer emulsion, a low solid content polyurethane dispersion, a seed latex, or combinations thereof; (3) and a chain extender. The ultra-high solid content polyurethane dispersion has a solid content of at least 60 percent by weight of the solid, based on the total weight of the ultra-high solid content polyurethane dispersion, and a viscosity in the range of less than 5000 cps at 20 rpm at 21° C. using spindle #4 with Brookfield viscometer. The method for producing a high-solid content polyurethane dispersion includes the following steps: (1) providing a first stream, wherein said first stream comprising a first polyurethane prepolymer or a first polyurethane prepolymer emulsion; (2) providing a second stream, wherein said second stream being a media phase selected from the group consisting of a second polyurethane prepolymer, a second polyurethane prepolymer emulsion, a polyurethane prepolymer dispersion, a seed latex emulsion, or combinations thereof; (3) continuously merging said first stream with said second stream in the presence of a chain extender; and (4) thereby forming a polyurethane dispersion having a solid content of at least 60 percent by weight of the solid, based on the total weight of the ultra-high solid content polyurethane dispersion, and a viscosity in the range of less than 5000 cps at 20 rpm at 21° C. using spindle #4 with Brookfield viscometer.

BRIEF DESCRIPTION OF THE DRAWINGS

For the purpose of illustrating the invention, there is shown in the drawings an exemplary form; it being understood, however, that this invention is not limited to the precise arrangements and instrumentalities shown.

DETAILED DESCRIPTION OF THE INVENTION

The instant invention is an ultra-high solid content polyurethane dispersion, and a continuous process for producing ultra-high solid content polyurethane dispersions. The ultra-high solid content polyurethane dispersion includes the reaction product of: (1) a first component, wherein the first component is a first polyurethane prepolymer or a first polyurethane prepolymer emulsion; (2) a second component, wherein the second component is a second polyurethane prepolymer, a second polyurethane prepolymer emulsion, a low solid content polyurethane dispersion, a seed latex, or combinations thereof; (3) and a chain extender. The ultra-high solid content polyurethane dispersion has a solid content of at least 60 percent by weight of the solid, based on the total weight of the ultra-high solid content polyurethane dispersion, and a viscosity in the range of less than 5000 cps at 20 rpm at 21° C. using spindle #4 with Brookfield viscometer.

The terms "polyurethane" and "poly (urea-urethane)," as used herein, may be used interchangeably.

The ultra-high solid content polyurethane dispersion may have any number of polymers; for example, the ultra-high solid content polyurethane dispersion may comprise at least two different polymers. The ultra-high solid content polyurethane dispersion may, for example, comprise a first polymer and a second polymer. First polymer may, for example, be a first polyurethane, and the second polymer may be a second polyurethane, polyolefin, polyacrylate, combinations thereof, or the like. The ultra-high solid content polyurethane dispersion may comprise from 5 to 95 percent by weigh of the first polymer, and from 5 to 95 percent by weight of the second polymer, based on the total weight of the ultra-high solid content polyurethane dispersion. All individual values and subranges from 5 to 95 weight percent are included herein and disclosed herein; for example, ultra-high solid content polyurethane dispersion may comprise from 5 to 45 percent by weigh of the first polymer, and from 55 to 95 percent by weight of the second polymer, based on the total weight of the ultra-high solid content polyurethane dispersion.

The ultra-high solid content polyurethane dispersion may comprise at least 60 percent by weight of solid content, excluding the weight of any filler, based on the total weight of the ultra-high solid content polyurethane dispersion. All individual values and subranges of at least 60 weight percent are included herein and disclosed herein; for example, the ultra-high solid content polyurethane dispersion may comprise at least 65 percent by weight of solid content, excluding the weight of any filler, based on the total weight of the ultra-high solid content polyurethane dispersion; or in the alternative, the ultra-high solid content polyurethane dispersion may comprise at least 70 percent by weight of solid content, excluding the weight of any filler, based on the total weight of the ultra-high solid content polyurethane dispersion. The ultra-high solid content polyurethane dispersion may, for example, comprise of at least two volume average particle size diameters; for example, the ultra-high solid content polyurethane dispersion may, for example, comprise of a first volume average particle size diameter, and a second volume average particle size diameter. Volume average particle size diameter, as used herein, refers to $$Dv = \left[\frac{\sum n_i d_i^3}{\sum n_i}\right]^{1/3};$$

wherein where $D_v$ is the volume average particle size, $n_i$ is the number of particles of diameter $d_i$; and Polydispersity index ("PDI"), as used herein refers to $$PDI = \frac{\left[\frac{\sum n_n d_i^4}{\sum n_i d_i}\right]}{\left[\frac{\sum n_i d_i}{\sum n_i}\right]}.$$

Additionally, the ultra-high solid content polyurethane dispersion may comprise additional volume average particle size diameters. The first volume average particle size diameter may be in the range of 0.05 to 5.0 micron. All individual values and subranges from 0.05 to 5.0 micron are included herein and disclosed herein; for example, the first volume average particle size diameter may be in the range of 0.07 to 1.0 micron; or in the alternative, the first volume average particle size diameter may be in the range of 0.08 to 0.2 micron. The second volume average particle size diameter may be in the range of 0.05 to 5.0 micron. All individual values and subranges from 0.05 to 5.0 micron are included herein and disclosed herein; for example, the second volume average particle size diameter may be in the range of 0.07 to 1.0 micron; or in the alternative, the second volume average particle size diameter may be in the range of 0.08 to 0.2 micron. The ultra-high solid content polyurethane dispersion may have a bimodal or multimodal particle size distribution. The ultra-high solid content polyurethane dispersion may have any particle size distributions; for example, the ultra-high solid content polyurethane dispersion may have a particle size distribution in the range of 1:2 to 1:20 based on the percent volume of first volume average particle size diameter to the second volume average particle size diameter. All individual values and subranges from 1:2 to 1:20 are included herein and disclosed herein; for example, the ultra-high solid content polyurethane dispersion may have a particle size distribution in the range of 1:2 to 1:10 based on the percent volume of the first volume average particle size diameter to second volume average particle size; or in the alternative, the ultra-high solid content polyurethane dispersion may have a particle size distribution in the range of 1:3 to 1:5 based on the percent volume of the first volume average particle size diameter to the second volume average particle size diameter. The particle volume average particle size diameter and particle size distribution are important factors to the instant invention because these factors facilitate the production of the inventive ultra-high solid content polyurethane dispersions while maintaining lower viscosities. The ultra-high solid content polyurethane dispersion may have a polydispersity index ($M_W/M_Z$) in the range of less than 5. All individual values and subranges in the range of less than 5 are included herein and disclosed herein; for example, the ultra-high solid content polyurethane dispersion may have a polydispersity index ($M_W/M_Z$) in the range of less than 3; or in the alternative, the ultra-high solid content polyurethane dispersion may have a polydispersity index ($M_W/M_Z$) in the range of less than 2. The ultra-high solid content polyurethane dispersion may have a viscosity in the range of less than 5000 cps at 20 rpm at 21° C. using spindle #4 with Brookfield viscometer. All individual values and subranges in the range of less than 5000 cps at 20 rpm at 21° C. using spindle #4 with Brookfield viscometer are included herein and disclosed herein; for example, the ultra-high solid content polyurethane dispersion may have a viscosity in the range of less than 4000 cps at 20 rpm at 21° C. using spindle #4 with Brookfield viscometer; or in the alternative, the ultra-high solid content polyurethane dispersion may have a viscosity in the range of less than 3500 cps at 20 rpm at 21° C. using spindle #4 with Brookfield viscometer.

The first component may be a first polyurethane prepolymer or a first polyurethane prepolymer emulsion.

The term "first polyurethane prepolymer," as used herein refers to a stream containing a first polyurethane prepolymer. The first polyurethane prepolymer contains substantially no organic solvent and also has at least two isocyanate groups per one molecule. Such a first urethane prepolymer, as used herein, further refers to a polyurethane prepolymer wherein the content of the organic solvent in the polyurethane prepolymer is 10 percent by weight or less based on the total weight of the first polyurethane prepolymer. To eliminate the step of removing the organic solvent, the content of the organic solvent may, for example, be 5 percent by weight or less based on the total weight of the first polyurethane prepolymer; or in the alternative, the content of the organic solvent may be 1 percent by weight or less based on the total weight of the first polyurethane prepolymer; or in another alternative, the content of the organic solvent may be 0.1 percent by weight or less based on the total weight of the first polyurethane prepolymer.

The number average molecular weight of the first polyurethane prepolymer used in the present invention may, for example, be within the range from 1,000 to 200,000. All individual values and subranges from 1,000 to 200,000 are included herein and disclosed herein; for example, the first polyurethane prepolymer may have a number average molecular weight in the range of 2,000 to about 20,000. The polyurethane prepolymer may further include small amounts of monomeric isocyanates.

The first polyurethane prepolymer used in the present invention may be produced by any conventionally known processes, for example, solution process, hot melt process, or prepolymer mixing process. Furthermore, the first polyurethane prepolymer may, for example, be produced via a process for reacting a polyisocyanate compound with an active hydrogen-containing compound and examples thereof include 1) a process for reacting a polyisocyanate compound with a polyol compound without using an organic solvent, and 2) a process for reacting a polyisocyanate compound with a polyol compound in an organic solvent, followed by removal of the solvent.

For example, the polyisocyanate compound may be reacted with the active hydrogen-containing compound at a temperature in the range of 20° C. to 120° C.; or in the alternative, in the range of 30° C. to 100° C., at an equivalent ratio of an isocyanate group to an active hydrogen group of, for example, from 1.1:1 to 3:1; or in the alternative, from 1.2:1 to 2:1. In the alternative, the prepolymer may be prepared with an excess amount of polyols thereby facilitating the production of hydroxyl terminal polymers.

For example, an excess isocyanate group may optionally be reacted with aminosilane, thereby converting the terminal group into a reactive group other than isocyanate group, such as an alkoxysilyl group.

The first polyurethane prepolymer may further include a polymerizable acrylic, styrenic, or vinyl monomers as a diluent, which can then be polymerized by free radical polymerization via an initiator.

Examples of the polyisocyanate compound include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3 and 1,4-bis(isocyanatemethyl) isocynate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate, isomers thereof, and/or combinations thereof.

The active hydrogen-containing compound used to produce the first polyurethane prepolymer used in the present invention includes, but is not limited to, for example, a compound having comparatively high molecular weight (hereinafter referred to as a first high-molecular weight compound) and a compound having comparatively low molecular weight (hereinafter referred to as a first low-molecular weight compound).

The number average molecular weight of the first high-molecular weight compound may, for example, be within a range from 300 to 20,000; or in the alternative, within a range from 500 to 5,000. The number average molecular weight of the first low-molecular weight compound may, for example, be less than 300. These active hydrogen-containing compounds may be used alone, or two or more kinds of them may be used in combination.

Among these active hydrogen-containing compounds, examples of the first high-molecular weight compound include, but are not limited to aliphatic and aromatic polyester polyols including caprolactone based polyester polyols, seed oil based polyester polyols, any polyester/polyether hybrid polyols, PTMEG-based polyether polyols; polyether polyols based on ethylene oxide, propylene oxide, butylene oxide and mixtures thereof; polycarbonate polyols; polyacetal polyols, polyacrylate polyols; polyesteramide polyols; polythioether polyols; polyolefin polyols such as saturated or unsaturated polybutadiene polyols.

As the polyester polyol, polyester polyol, for example, obtained by the polycondensation reaction of a glycol and an acid may be used.

Examples of the glycol, which can be used to obtain the polyester polyol, include, but are not limited to, ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, polyethylene glycol, dipropylene glycol, tripropylene glycol, bishydroxyethoxybenzene, 1,4-cyclohexanediol, 1,4-cyclohexanedimethanol, bisphenol A, mixture of 1,3- and 1,4-cyclohexanedimethanol (UNOXOL™-diol), hydrogenated bisphenol A, hydroquinone, and alkylene oxide adducts thereof.

Examples of the acid, which can be used to obtain the polyester polyol, include, but are not limited to, succinic acid, adipic acid, azelaic acid, sebacic acid, dodecanedicarboxylic acid, maleic anhydride, fumaric acid, 1,3-cyclopentanedicarboxylic acid, 1,4-cyclohexanedicarboxylic acid, terephthalic acid, isophthalic acid, phthalic acid, 1,4-naphthalenedicarboxylic acid, 2, 5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and anhydrides or ester-forming derivatives of these dicarboxylic acids; and p-hydroxybenzoic acid, p-(2-hydroxyethoxy)benzoic acid, and ester-forming derivatives of these hydroxycarboxylic acids.

Also a polyester obtained by the ring-opening polymerization reaction of a cyclic ester compound such as ε-caprolactone, and copolyesters thereof may be used.

The polyester polyols may also be produced by transesterification of the above-mentioned diols and triols with hydroxy group containing fatty acid methyl esters.

Examples of the polyether polyol include, but are not limited to, compounds obtained by the polyaddition reaction of one or more kinds of compounds having at least two active hydrogen atoms such as ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, trimethylolpropane, sorbitol, sucrose, ethylenediamine, diethylenetriamine, triisopropanolamine, pyrogallol, dihydroxybenzoic acid, hydroxyphthalic acid, and 1,2,3-propanetrithiol with one or more kinds among ethylene oxide, propylene oxide, butylene oxide, styrene oxide, epichlorohydrin, and tetrahydrofuran.

Examples of the polycarbonate polyol include, but are not limited to, compounds obtained by the reaction of glycols such as 1,4-butanediol, 1,6-hexanediol, and diethylene glycol, with diphenyl carbonate and phosgene.

Among the active hydrogen-containing compounds, the first low-molecular weight compound is a compound which has at least two active hydrogens per one molecule and has a number average molecular weight of less than 300, and examples thereof include, but are not limited to, glycol components used as raw materials of the polyester polyol; polyhydroxy compounds such as glycerin, trimethylolethane, trimethylolpropane, sorbitol, and pentaerythritol; and amine compounds such as ethylenediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, 1,4-cyclohexanediamine, 1,2-propanediamine, hydazine, diethylenetriamine, and triethylenetetramine.

The first urethane prepolymer may further include a hydrophilic group. The term "hydrophilic group," as used herein, refers to an anionic group (for example, carboxyl group, sulfonic acid group, or phosphoric acid group), or a cationic group (for example, tertiary amino group, or quaternary amino group), or a nonionic hydrophilic group (for example, a group composed of a repeating unit of ethylene oxide, or a group composed of a repeating unit of ethylene oxide and a repeating unit of another alkylene oxide).

Among hydrophilic groups, a nonionic hydrophilic group having a repeating unit of ethylene oxide may, for example, be preferred because the finally obtained polyurethane emulsion has excellent compatibility with other kinds of emulsions. Introduction of a carboxyl group and/or a sulfonic acid group is effective to make the particle size finer.

The ionic group refers to a functional group capable of serving as a hydrophilic ionic group which contributes to self dispersibility in water by neutralization, providing colloidal stability during the processing against agglomeration; stability during shipping, storage and formulation with other additives. These hydrophilic groups could also introduce application specific properties such as adhesion.

When the ionic group is an anionic group, the neutralizer used for neutralization includes, for example, nonvolatile bases such as sodium hydroxide and potassium hydroxide; and volatile bases such as tertiary amines (for example, trimethylamine, triethylamine, dimethylethanolamine, methyldiethanolamine, and triethanolamine) and ammonia can be used.

When the ionic group is a cationic group, usable neutralizer includes, for example, inorganic acids such as hydrochloric acid, sulfuric acid, and nitric acid; and organic acids such as formic acid and acetic acid.

Neutralization may be conducted before, during or after the polymerization of the compound having an ionic group. Alternatively, neutralization may be conducted during or after the polyurethane polymerization reaction.

To introduce a hydrophilic group in the first polyurethane prepolymer, a compound, which has at least one active hydrogen atom per one molecule and also has the above hydrophilic group, may be used as an active hydrogen-containing compound. Examples of the compound, which has at least one active hydrogen atom per one molecule and also has the above hydrophilic group, include:

(1) sulfonic acid group-containing compounds such as 2-oxyethanesulfonic acid, phenolsulfonic acid, sulfobenzoic acid, sulfosuccinic acid, 5-sulfoisophthalic acid, sulfanilic acid, 1,3-phenylenediamine-4,6-disulfonic acid, and 2,4-diaminotoluene-5-sulfonic acid, and derivatives thereof, or polyester polyols obtained by copolymerizing them;

(2) carboxylic acid-containing compounds such as 2,2-dimethylolpropionic acid, 2,2-dimethylolbutyric acid, 2,2-dimethylolvaleric acid, dioxymaleic acid, 2,6-dioxybenzoic acid, and 3,4-diaminobenzoic acid, and derivatives thereof, or polyester polyols obtained by copolymerizing them; tertiary amino group-containing compounds such as methyldiethanolamine, butyldiethanolamine, and alkyldiisopropanolamine, and derivatives thereof, or polyester polyol or polyether polyol obtained by copolymerizing them;

(3) reaction products of the above tertiary amino group-containing compounds, or derivatives thereof, or polyester polyols or polyether polyols obtained by copolymerizing them, with quaternizing agents such as methyl chloride, methyl bromide, dimethylsulfuric acid, diethylsulfuric acid, benzyl chloride, benzyl bromide, ethylenechlorohydrin, ethylenebromohydrin, epichlorohydrin, and bromobutane;

(4) nonionic group-containing compounds such as polyoxyethylene glycol or polyoxyethylene-polyoxypropylene copolymer glycol, which has at least 30 percent by weight of a repeating unit of ethylene oxide and at least one active hydrogen in the polymer and also has a molecular weight of 300 to 20,000, polyoxyethylene-polyoxybutylene copolymer glycol, polyoxyethylene-polyoxyalkylene copolymer glycol, and monoalkyl ether thereof, or polyester-polyether polyols obtained by copolymerizing them; and (5) combinations thereof.

The second component may be a selected from the group consisting of a second polyurethane prepolymer, a second polyurethane prepolymer emulsion, a low solid content polyurethane dispersion, a seed latex, and combinations thereof.

The term "second polyurethane prepolymer emulsion," as used herein refers to a stream containing a second polyurethane prepolymer. The second polyurethane prepolymer contains substantially no organic solvent and also has at least two isocyanate groups per one molecule. Such a second polyurethane prepolymer, as used herein, further refers to a polyurethane prepolymer wherein the content of the organic solvent in the polyurethane prepolymer is 10 percent by weight or less based on the total weight of the second polyurethane prepolymer. To eliminate the step of removing the organic solvent, the content of the organic solvent may, for example, be 5 percent by weight or less based on the total weight of the second polyurethane prepolymer; or in the alternative, the content of the organic solvent may be 1 percent by weight or less based on the total weight of the second polyurethane prepolymer; or in another alternative, the content of the organic solvent may be 0.1 percent by weight or less based on the total weight of the second polyurethane prepolymer.

The number average molecular weight of the second polyurethane prepolymer used in the present invention may, for example, be within the range from 1,000 to 200,000. All individual values and subranges from 1,000 to 200,000 are included herein and disclosed herein; for example, the second polyurethane prepolymer may have a number average molecular weight in the range of 2,000 to about 20,000. The polyurethane prepolymer may further include small amounts of monomeric isocyanates.

The second polyurethane prepolymer used in the present invention may be produced by any conventionally known processes, for example, solution process, hot melt process, or prepolymer mixing process. Furthermore, the second urethane prepolymer may, for example, be produced via a process for reacting a polyisocyanate compound with an active hydrogen-containing compound and examples thereof include 1) a process for reacting a polyisocyanate compound with a polyol compound without using an organic solvent, and 2) a process for reacting a polyisocyanate compound with a polyol compound in an organic solvent, followed by removal of the solvent. The final prepolymer may be NCO or OH terminated.

For example, the polyisocyanate compound may be reacted with the active hydrogen-containing compound at a temperature in the range of 20° C. to 120° C.; or in the alternative, in the range of 30° C. to 100° C., at an equivalent ratio of an isocyanate group to an active hydrogen group of, for example, from 1.1:1 to 3:1, or in the alternative, from 1.2:1 to 2:1. In the alternative, the prepolymer may be prepared with an excess amount of polyols thereby facilitating the production of hydroxyl terminal polymers.

For example, an excess isocyanate group may optionally be reacted with aminosilane, thereby converting the terminal group into a reactive group other than isocyanate group, such as an alkoxysilyl group.

The second polyurethane prepolymer may further include a polymerizable acrylic, styrenic, or vinyl monomers as a diluent, which can then be polymerized by free radical polymerization via an initiator.

Examples of the polyisocyanate compound include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3 and 1,4-bis (isocyanatemethyl) isocynate, xylylene diisocyanate, tetramethylxylylene diisocyanate, hydrogenated xylylene diisocyanate, lysine diisocyanate, isophorone diisocyanate, 4,4'-dicyclohexylmethane diisocyanate, 3,3'-dimethyl-4,4'-dicyclohexylmethane diisocyanate, isomers thereof, and/or combinations thereof.

The active hydrogen-containing compound used to produce the second polyurethane prepolymer used in the present invention includes, but is not limited to, for example, a compound having comparatively high molecular weight (hereinafter referred to as a second high-molecular weight compound) and a compound having comparatively low molecular weight (hereinafter referred to as a second low-molecular weight compound).

The number average molecular weight of the second high-molecular weight compound may, for example, be within a range from 300 to 20,000; or in the alternative, within a range from 500 to 5,000. The number average molecular weight of the second low-molecular weight compound may, for example, be less than 300. These active hydrogen-containing compounds may be used alone, or two or more kinds of them may be used in combination.

Among these active hydrogen-containing compounds, examples of the second high-molecular weight compound include, but are not limited to aliphatic and aromatic polyester polyols including caprolactone based polyester polyols, seed oil based polyester polyols, any polyester/polyether hybrid polyols, PTMEG-based polyether polyols; polyether polyols based on ethylene oxide, propylene oxide, butylene oxide and mixtures thereof; polycarbonate polyols; polyacetal polyols; polyacrylate polyols; polyesteramide polyols; polythioether polyols; and polyolefin polyols such as saturated or unsaturated polybutadiene polyols.

As the polyester polyol, polyester polyols, for example, obtained by the polycondensation reaction of a glycol and an acid may be used.

Examples of the glycol, which can be used to obtain the polyester polyol, include, but are not limited to, ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, polyethylene glycol, dipropylene glycol, tripropylene glycol, bishydroxyethoxybenzene, 1,4-cyclohexanediol, 1,4-cyclohexanedimethanol, bisphenol A, mixture of 1,3- and 1,4-cyclohexanedimethanol (UNOXOL™-diol), hydrogenated bisphenol A, hydroquinone, and alkylene oxide adducts thereof.

Examples of the acid, which can be used to obtain the polyester polyol, include, but are not limited to, succinic acid, adipic acid, azelaic acid, sebacic acid, dodecanedicarboxylic acid, maleic anhydride, fumaric acid, 1,3 cyclopentanedicarboxylic acid, 1,4-cyclohexanedicarboxylic acid, terephthalic acid, isophthalic acid, phthalic acid, 1,4-naphthalenedicarboxylic acid, 2, 5-naphthalenedicarboxylic acid, 2,6-naphthalenedicarboxylic acid, naphthalic acid, biphenyldicarboxylic acid, 1,2-bis(phenoxy)ethane-p,p'-dicarboxylic acid, and anhydrides or ester-forming derivatives of these dicarboxylic acids; and p-hydroxybenzoic acid, p-(2-hydroxyethoxy)benzoic acid, and ester-forming derivatives of these hydroxycarboxylic acids.

Also a polyester obtained by the ring-opening polymerization reaction of a cyclic ester compound such as C-caprolactone, and copolyesters thereof can be used.

The polyester polyols can also be produced by transesterification of the above mentioned diols and triols with hydroxy group containing fatty acid methyl esters.

Examples of the polyether polyol include, but are not limited to, compounds obtained by the polyaddition reaction of one or more kinds of compounds having at least two active hydrogen atoms such as ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, trimethylolpropane, sorbitol, sucrose, ethylenediamine, diethylenetriamine, triisopropanolamine, pyrogallol, dihydroxybenzoic acid, hydroxyphthalic acid, and 1,2,3-propanetrithiol with one or more kinds among ethylene oxide, propylene oxide, butylene oxide, styrene oxide, epichlorohydrin, and tetrahydrofuran.

Examples of the polycarbonate polyol include, but are not limited to, compounds obtained by the reaction of glycols such as 1,4-butanediol, 1,6-hexanediol, and diethylene glycol, with diphenyl carbonate and phosgene.

Among the active hydrogen-containing compounds, the second low-molecular weight compound is a compound which has at least two active hydrogens per one molecule and has a number average molecular weight of less than 300, and examples thereof include, but are not limited to, glycol components used as raw materials of the polyester polyol; polyhydroxy compounds such as glycerin, trimethylolethane, trimethylolpropane, sorbitol, and pentaerythritol; and amine compounds such as ethylenediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, 1,4-cyclohexanediamine, 1,2-propanediamine, hydazine, diethylenetriamine, and triethylenetetramine.

The second urethane prepolymer may further include a hydrophilic group. The term "hydrophilic group," as used herein, refers to an anionic group (for example, carboxyl group, sulfonic acid group, or phosphoric acid group), or a cationic group (for example, tertiary amino group, or quaternary amino group), or a nonionic hydrophilic group (for example, a group composed of a repeating unit of ethylene oxide, or a group composed of a repeating unit of ethylene oxide and a repeating unit of another alkylene oxide).

Among hydrophilic groups, a nonionic hydrophilic group having a repeating unit of ethylene oxide may, for example, be preferred because the finally obtained polyurethane emulsion has excellent compatibility with other kinds of emulsions. Introduction of a carboxyl group and/or a sulfonic acid group is effective to make the particle size finer.

The ionic group refers to a functional group capable of serving as a hydrophilic ionic group which contributes to self dispersibility in water by neutralization, providing colloidal stability during the processing against agglomeration; stability during shipping, storage and formulation with other additives. These hydrophilic groups could also introduce application specific properties such as adhesion.

When the ionic group is an anionic group, the neutralizer used for neutralization includes, for example, nonvolatile bases such as sodium hydroxide and potassium hydroxide; and volatile bases such as tertiary amines (for example, trimethylamine, triethylamine, dimethylethanolamine, methyldiethanolamine, and triethanolamine) and ammonia can be used.

When the ionic group is a cationic group, usable neutralizer includes, for example, inorganic acids such as hydrochloric acid, sulfuric acid, and nitric acid; and organic acids such as formic acid and acetic acid.

Neutralization may be conducted before, during or after the polymerization of the compound having an ionic group. Alternatively, neutralization may be conducted during or after the polyurethane polymerization reaction.

To introduce a hydrophilic group in the second polyurethane prepolymer, a compound, which has at least one active hydrogen atom per one molecule and also has the above hydrophilic group, may be used as an active hydrogen-containing compound. Examples of the compound, which has at least one active hydrogen atom per one molecule and also has the above hydrophilic group, include:

(1) sulfonic acid group-containing compounds such as 2-oxyethanesulfonic acid, phenolsulfonic acid, sulfobenzoic acid, sulfosuccinic acid, 5-sulfoisophthalic acid, sulfanilic acid, 1,3-phenylenediamine-4,6-disulfonic acid, and 2,4-diaminotoluene-5-sulfonic acid, and derivatives thereof, or polyester polyols obtained by copolymerizing them;

(2) carboxylic acid-containing compounds such as 2,2-dimethylolpropionic acid, 2,2-dimethylolbutyric acid, 2,2-dimethylolvaleric acid, dioxymaleic acid, 2,6-dioxybenzoic acid, and 3,4-diaminobenzoic acid, and derivatives thereof, or polyester polyols obtained by copolymerizing them; tertiary amino group-containing compounds such as methyldiethanolamine, butyldiethanolamine, and alkyldiisopropanolamine, and derivatives thereof, or polyester polyol or polyether polyol obtained by copolymerizing them;

(3) reaction products of the above tertiary amino group-containing compounds, or derivatives thereof, or polyester polyols or polyether polyols obtained by copolymerizing them, with quaternizing agents such as methyl chloride, methyl bromide, dimethylsulfuric acid, diethylsulfuric acid, benzyl chloride, benzyl bromide, ethylenechlorohydrin, ethylenebromohydrin, epichlorohydrin, and bromobutane;

(4) nonionic group-containing compounds such as polyoxyethylene glycol or polyoxyethylene-polyoxypropylene copolymer glycol, which has at least 30 percent by weight of a repeating unit of ethylene oxide and at least one active hydrogen in the polymer and also has a molecular weight of 300 to 20,000, polyoxyethylene-polyoxybutylene copolymer glycol, polyoxyethylene-polyoxyalkylene copolymer glycol, and monoalkyl ether thereof, or polyester-polyether polyols obtained by copolymerizing them; and (5) combinations thereof.

The term "low solid content polyurethane dispersion," as used herein, refers to a polyurethane dispersion that contains less than 60 percent by weight of polyurethane particles based on the total weight of the polyurethane dispersion. All individual values and subranges in the range of less than 60 weight percent are included herein and disclosed herein; for example, less than 50 weight percent; or in the alternative, less than 40 weight percent. The low solid content polyurethane dispersion may have a volume average particle size diameter; for example, the low solid content polyurethane dispersion may have a volume average particle size diameter in the range of 0.04 to 5.0 micron. All individual values and subranges from 0.04 to 5.0 micron are included herein and disclosed herein; for example, the low solid content polyurethane dispersion may have a volume average particle size diameter in the range of 0.07 to 1.0 micron; or in the alternative, the low solid content polyurethane dispersion may have a volume average particle size diameter in the range of 0.08 to 0.2 micron. The low solid content polyurethane dispersion may have any polydispersity; for example, the low solid content polyurethane dispersion may have a polydispersity in the range of 1 to 20. All individual values and subranges from 1 to 20 are included herein and disclosed herein; for example, the low solid content polyurethane dispersion may have a polydispersity in the range of 1 to 10; or in the alternative, the low solid content polyurethane dispersion may have polydispersity in the range of 1 to 2. Any conventional method may be employed to make such low solid content polyurethane dispersion.

The term "seed latex," as used herein refers to dispersions, suspensions, emulsions, or latexes of polyolefins such polyethylene and polypropylene, epoxies, silicon, styrene, acrylate, butadiene, isoprene, vinyl acetate, or copolymers thereof. The term "seed latex," as used herein, may, for example, further refer to emulsions of polyvinyl acetate, polyethylene-vinyl acetate, polyacrylic, or polyacrylic-styrenic; latexes of polystyrene-butadiene, polyacrylonitrile-butadiene, or polyacrylic-butadiene; aqueous dispersions of polyethylene and polyolefin ionomers; or various aqueous dispersions of polyurethane, polyester, polyamide, epoxy resin, copolymers thereof, or alloys thereof. The seed latex may have any volume average particle size diameter; for example, the seed latex may have a volume average particle size diameter in the range of 0.05 to 5.0 micron. All individual values and subranges from 0.05 to 5.0 micron are included herein and disclosed herein; for example, the seed latex may have a volume average particle size diameter in the range of 0.07 to 1.0 micron; or in the alternative, the seed latex may have a volume average particle size diameter in the range of 0.08 to 0.2 micron. The seed latex may have a bimodal or multimodal particle size distribution. The seed latex may have any polydispersity; for example, the seed latex may have a polydispersity in the range of 1 to 20. All individual values and subranges from 1 to 20 are included herein and disclosed herein; for example, seed latex may have a polydispersity in the range of 1 to 10; or in the alternative, the seed latex may have a polydispersity in the range of to 2. Any conventional method may be employed to make such dispersions, suspension, emulsions, or latexes. Such conventional methods include, but are not limited to, emulsion polymerization, suspension polymerization, micro-emulsion, mini-emulsion, or dispersion polymerization.

The term "surfactants," as used herein, refers to any compound that reduces surface tension when dissolved in water or water solutions, or that reduces interfacial tension between two liquids, or between a liquid and a solid. Surfactants useful for preparing a stable dispersion in the practice of the present invention may be cationic surfactants, anionic surfactants, zwitterionic, or a non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants, such as ethoxylated alcohol, ethoxylated fatty acid, sorbitan derivative, lanolin derivative, ethoxylated nonyl phenol or alkoxylated polysiloxane. Furthermore, the surfactants can be either external surfactants or internal surfactants. External surfactants are surfactants which do not become chemically reacted into the polymer during dispersion preparation. Examples of external surfactants useful herein include, but are not limited to, salts of dodecyl benzene sulfonic acid, and lauryl sulfonic acid salt. Internal surfactants are surfactants which do become chemically reacted into the polymer during dispersion preparation. Examples of an internal surfactant useful herein include, but are not limited to, 2,2-dimethylol propionic acid and its salts, quaternized ammonium salts, and hydrophilic species, such polyethylene oxide polyols.

Polyurethane prepolymers are typically chain extended via a chain extender. Any chain extender known to be useful to those of ordinary skill in the art of preparing polyurethanes can be used with the present invention. Such chain extenders typically have a molecular weight of 30 to 500 and have at least two active hydrogen containing groups. Polyamines are a preferred class of chain extenders. Other materials, particularly water, can function to extend chain length and so are chain extenders for purposes of the present invention. It is particularly preferred that the chain extender is water or a mixture of water and an amine such as, for example, aminated polypropylene glycols such as Jeffamine D-400 from Huntsman Chemical Company, amino ethyl piperazine, 2-methyl piperazine, 1,5-diamino-3-methyl-pentane, isophorone diamine, ethylene diamine, diethylene triamine, triethylene tetramine, triethylene pentamine, ethanol amine, lysine in any of its stereoisomeric forms and salts thereof, hexane diamine, hydrazine and piperazine. In the practice of the present invention, the chain extender may be used as a solution of chain extender in water.

Examples of the chain extender used in the present invention include water; diamines such as ethylenediamine, 1,2-propanediamine, 1,6-hexamethylenediamine, piperazine, 2-methylpiperazine, 2,5-dimethylpiperazine, isophoronediamine, 4,4'-dicyclohexylmethanediamine, 3,3'-dimethyl-4,4'-dicyclohexylmethanediamine, 1,2-cyclohexanediamine, 1,4-cyclohexanediamine, aminoethylethanolamine, aminopropylethanolamine, aminohexylethanolamine, aminoethylpropanolamine, aminopropylpropanolamine, and aminohexylpropanolamine; polyamines such as diethylenetriamine, dipropylenetriamine, and triethylenetetramine; hydrazines; acid hydrazides. These chain extenders can be used alone or in combination.

The ultra high-said content polyurethane dispersion maybe produced via continues method; or in the alternative, it maybe produced via batch process.

In production, the method for producing an ultra high-solid content polyurethane dispersion includes the following steps: (1) providing a first stream, wherein the first stream comprising a first polyurethane prepolymer or a first polyurethane prepolymer emulsion; (2) providing a second stream, wherein the second stream being a media phase selected from the group consisting of a second polyurethane prepolymer, a second polyurethane prepolymer emulsion, a polyurethane dispersion, a seed latex emulsion, or combinations thereof; (3) continuously merging the first stream with the second stream optionally in the presence of a chain extender; and (4) thereby forming a polyurethane dispersion having a solid content of at least 60 percent by weight of the solid, based on the total weight of the ultra-high solid content polyurethane dispersion, and a viscosity in the range of less than 5000 cps at 20 rpm at 21° C. using spindle #4 with Brookfield viscometer.

In an alternative production, the method for producing a high-solid content polyurethane dispersion includes the following steps: (1) providing a first stream, wherein the first stream being a first polyurethane prepolymer or a the polyurethane prepolymer stream; (2) providing a second stream, wherein the second stream being a media phase; (3) continuously merging the first and the second stream together optionally in the presence of a surfactant at a temperature in the range of 10° C. to 70° C., wherein the ratio of the first stream to the second stream being in the range of 0.1 to 0.6, and wherein the surfactant is optionally present in a concentration range of 0.1 to 3.0 percent, based on the total weight of the first stream, the second stream, and the surfactant; (4) thereby forming the ultra-high solid content polyurethane dispersion, wherein the ultra-high solid content polyurethane dispersion having at least a solid content of at least 60 percent by weight of said solid, based on the total weight of the ultra-high solid content polyurethane dispersion, and a viscosity in the range of less than 5000 cps at 20 rpm at 21° C. using spindle #4 with Brookfield viscometer.

Figure 1:
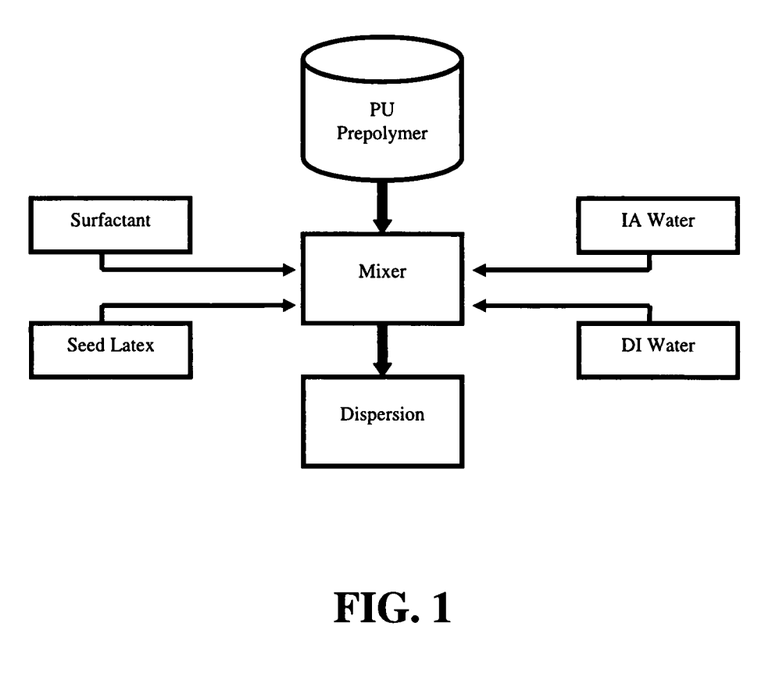
FIG. 1 is a block diagram illustrating a method of making an ultra-high solid content polyurethane dispersion.

Referring to FIG. 1, a first stream comprising a first polyurethane prepolymer, optionally a surfactant, and optionally water is fed into a mixer, for example an OAKS Mixer or an IKA Mixer, while a second stream comprising a media phase selected from the group consisting of a second polyurethane prepolymer, a second polyurethane prepolymer emulsion, a polyurethane dispersion, a seed latex emulsion, and/or combinations thereof is fed into the mixer. First stream and second stream are merged together optionally in the presence of a chain extender, dilution water, and/or combinations thereof. The first stream is emulsified into the second stream via high shear rate mixing thereby forming the ultra-high solid content polyurethane dispersion of the instant invention.

Figure 2:
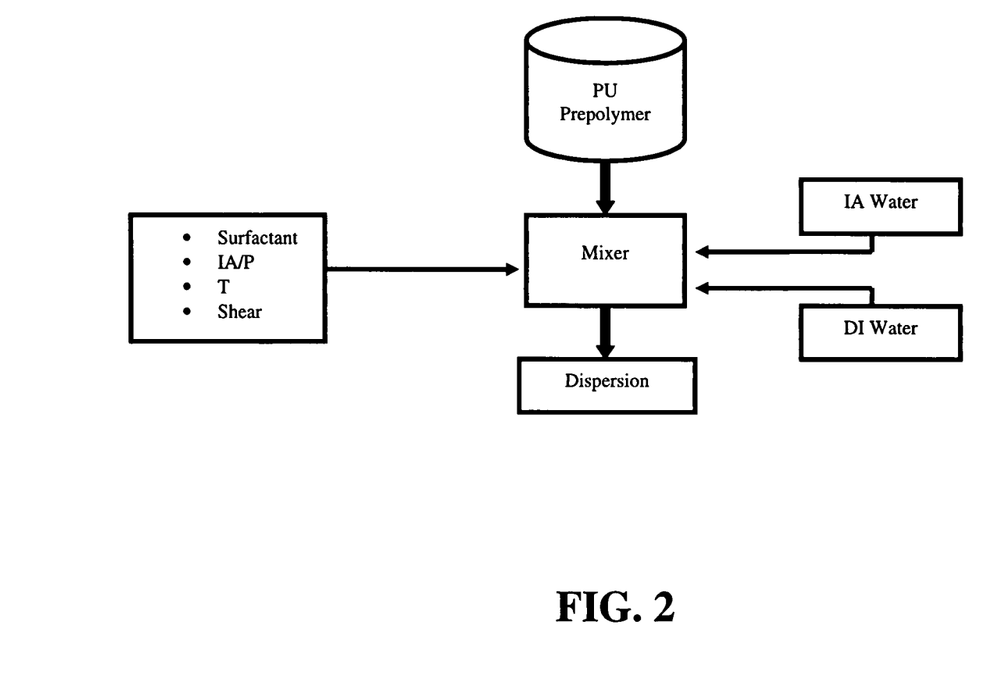
FIG. 2 is a block diagram illustrating a first alternative method of making an ultra-high solid content polyurethane dispersion.

Referring to FIG. 2 a first stream comprising a first polyurethane prepolymer, a surfactant, and water is fed into a mixer, for example an OAKS mixer or an IKA mixer, at a temperature in the range of 10° C. to 70° C., a first polyurethane prepolymer to water weight ratio in the range of about 0.3 to 0.5. Sufficient shear rate is provided to facilitate the formation of the ultra-high solid content polyurethane dispersion of the instant invention. Optionally a chain extender, dilution water, and/or combinations thereof may further be fed into the mixer, and merged with the first stream thereby forming the ultra-high solid content polyurethane dispersion of the instant invention.

Figure 3:
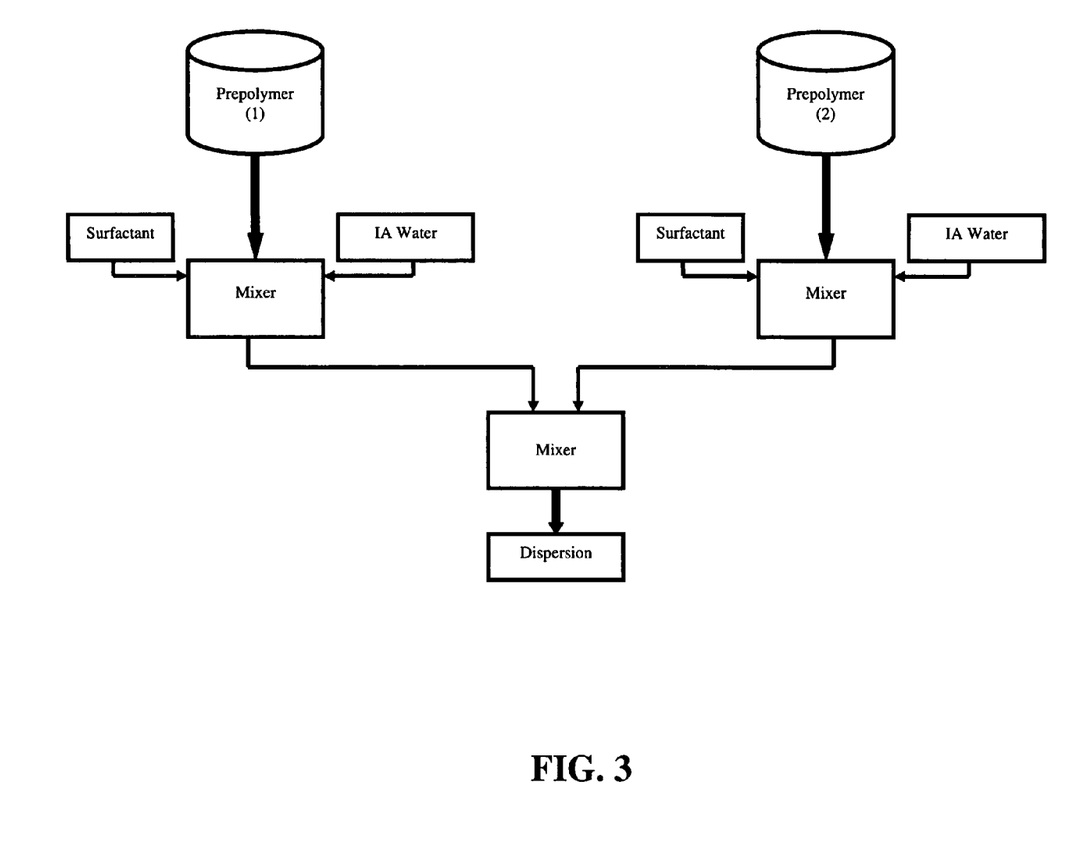
FIG. 3 is a block diagram illustrating a second alternative method of making an ultra-high solid content polyurethane dispersion.

Referring to FIG. 3, a first polyurethane prepolymer, optionally a surfactant, and optionally water are fed into a first mixer, for example an OAKS Mixer or an IKA Mixer, thereby forming a first stream, that is a first polyurethane prepolymer or a first polyurethane prepolymer emulsion. A second polyurethane prepolymer, optionally a surfactant, and optionally water are fed into a second mixer, for example an OAKS Mixer or an IKA Mixer, thereby forming a second stream, that is a second polyurethane prepolymer or a second polyurethane prepolymer emulsion. The first stream and second streams are fed into a third mixer, for example an OAKS Mixer or an IKA Mixer, and merged together optionally in the presence of a chain extender, dilution water, or combinations thereof thereby forming the ultra-high solid content polyurethane dispersion of the instant invention.

The high-solid content polyurethane dispersions may be dried in a shorter period of time relative to other dispersions. Furthermore, the high-solid content polyurethane dispersions may have a percent shrinkage in the range of less than 25 percent. All individual values and subranges less than 25 percent are included herein and disclosed herein; for example, the high-solid content polyurethane dispersions may have a percent shrinkage in the range of less than 22 percent; or in the alternative, the high-solid content polyurethane dispersions may have a percent shrinkage in the range of less than 20 percent.

The high-solid content polyurethane dispersions may be used in a variety of application, including, but not limited to, adhesives, binders, elastomers, coatings, paints, barrier coatings foamed articles, and/or medical articles. An exemplary article may comprise of the ultra-high solid content polyurethane dispersion of the instant invention.

In production, the method for producing an article includes the following steps: (1) providing a first stream, wherein the first stream comprising a first polyurethane prepolymer or a first polyurethane prepolymer emulsion; (2) providing a second stream, wherein the second stream being a media phase selected from the group consisting of a second polyurethane prepolymer, a second polyurethane prepolymer emulsion, a polyurethane dispersion, a seed latex emulsion, or combinations thereof; (3) continuously merging the first stream with the second stream optionally in the presence of a chain extender; (4) thereby forming a polyurethane dispersion having a solid content of at least 60 percent by weight of the solid, based on the total weight of the ultra-high solid content polyurethane dispersion, and a viscosity in the range of less than 5000 cps at 20 rpm at 21° C. using spindle #4 with Brookfield viscometer; (5) applying the dispersion to a substrate; (6) partially or fully drying the dispersion; and (7) thereby forming the article.

In an alternative production, the method for producing an article includes the following steps: (1) providing a first stream, wherein the first stream comprising a first polyurethane prepolymer or a first polyurethane prepolymer emulsion; (2) providing a second stream, wherein the second stream being a media phase selected from the group consisting of a second polyurethane prepolymer, a second polyurethane prepolymer emulsion, a polyurethane dispersion, a seed latex emulsion, or combinations thereof; (3) continuously merging the first stream with the second stream optionally in the presence of a chain extender; (4) thereby forming a polyurethane dispersion having a solid content of at least 60 percent by weight of the solid, based on the total weight of the ultra-high solid content polyurethane dispersion, and a viscosity in the range of less than 5000 cps at 20 rpm at 21° C. using spindle #4 with Brookfield viscometer; (5) frothing the dispersion; (6) thereby forming a foam; (7) partially or fully drying the foam; and (8) thereby forming the article.

In an alternative method for producing an ultra-high solid content polyurethane dispersion includes the following steps: (1) providing a first stream, wherein the first stream comprising a first polyurethane prepolymer or a first polyurethane prepolymer emulsion; (2) providing a second stream, wherein the second stream being a media phase selected from the group consisting of a second polyurethane prepolymer, a second polyurethane prepolymer emulsion, a polyurethane dispersion, a seed latex emulsion, or combinations thereof; (3) continuously merging the first stream with the second stream optionally in the presence of a chain extender in a ration of 1:9 to 9:1 based on the solid content of first stream to the second stream; (4) thereby forming a polyurethane dispersion having a solid content of at least 60 percent by weight of the solid, based on the total weight of the ultra-high solid content polyurethane dispersion, and a viscosity in the range of less than 5000 cps at 20 rpm at 21° C. using spindle #4 with Brookfield viscometer.

Examples

The present invention will now be explained in further detail by showing Inventive Examples, and Comparative Examples, but the scope of the present invention is not, of course, limited to these Examples.

Inventive Examples 1-8, and Comparative Example A were prepared according to the following procedures.

Polyurethane Prepolymer Synthesis 810 grams of Tone 2241 (Caprolactone base polyester polyol having a molecular weight of 2000), 20 grams of Carbowax 1000 (Polyethylene oxide having a molecular weight of 1000), 10 grams of MPEG-950 (Polyethylene glycol monol having molecular weight of 950) were admixed in a flask at 60° C. under a mild stirring condition. After all the above-mentioned components were melted, 160 grams of IPDI (Isophorone diisocyanate) was gradually added into the mixture while being stirred. The temperature was raised to 90° C., and the mixture was stirred for 9 additional hours. The resulting polyurethane prepolymer comprised 2.44 weight percent NCO.

Seed Latex Formulations

Three acrylate latexes having different amounts of solids were employed to prepare the inventive examples of the instant invention. The first acrylate latex was UCAR 163S comprising 56.2 percent by weight of solid based on the total weight of the acrylate latex. The second acrylate latex was UCAR 169S comprising 61.3 percent by weight of solid based on the total weight of the acrylate latex. The Third acrylate latex was UCAR 9192 comprising 65.6 percent by weight of solid based on the total weight of the acrylate latex.

Example 1

30 grams of the above-described polyurethane prepolymer was fed into a high shear mixing device where it was emulsified into 100 grams of first acrylate latex, UCAR 163S. The resulting ultra-high solid content polyurethane dispersion comprised 69 percent by weight of solid particles, excluding the weight of any filler, based on the total weight of the dispersion. The ultra-high solid content polyurethane dispersion had a viscosity of 1900 cps at 20 rpm at 21° C. using #4 spindle, and a viscosity of 1248 cps at 50 rpm at 21° C. using #4 spindle with Brookfield viscometer.

Example 2

40 grams of the above-described polyurethane prepolymer was fed into a high shear mixing device where it was emulsified into 100 grams of first acrylate latex, UCAR 163S. The resulting ultra-high solid content polyurethane dispersion had a bimodal particle size and a very broad particle size distribution. The resulting ultra-high solid content polyurethane dispersion comprised 69 percent by weight of solid particles, excluding the weight of any filler, based on the total weight of the dispersion. The ultra-high solid content polyurethane dispersion had a viscosity of 1380 cps at 20 rpm at 21° C. using #4 spindle with Brookfield viscometer, and a viscosity of 950 cps at 50 rpm at 21° C. using #4 spindle with Brookfield viscometer. The final ratio of urethane to acrylate was 0.35.

Example 3

40 grams of the above-described polyurethane prepolymer was fed into a high shear mixing device where it was emulsified into 100 grams of second acrylate latex, UCAR 169S. The resulting ultra-high solid content polyurethane dispersion had a bimodal particle size and a very broad particle size distribution. The resulting ultra-high solid content polyurethane dispersion comprised 73.5 percent by weight of solid particles, excluding the weight of any filler, based on the total weight of the dispersion. The ultra-high solid content polyurethane dispersion had a viscosity of 2720 cps at 20 rpm at 21° C. using #4 spindle, and a viscosity of 1852 cps at 50 rpm at 21° C. using #4 spindle with Brookfield viscometer. The final ratio of urethane to acrylate was 0.39.

Example 4

19 grams of the above-described polyurethane prepolymer was fed into a high shear mixing device where it was emulsified into 100 grams of first acrylate latex, UCAR 9192. The resulting ultra-high solid content polyurethane dispersion had a bimodal particle size and a very broad particle size distribution. The resulting ultra-high solid content polyurethane dispersion comprised 71 percent by weight of solid particles, excluding the weight of any filler, based on the total weight of the dispersion. The ultra-high solid content polyurethane dispersion had a viscosity of 1430 cps at 20 rpm at 21° C. using #4 spindle with Brookfield viscometer, and a viscosity of 888 cps at 50 rpm at 21° C. using #4 spindle with Brookfield viscometer. The final ratio of urethane to acrylate was 0.26.

Example 5

22 grams of the above-described polyurethane prepolymer was fed into a high shear mixing device where it was emulsified into 100 grams of first acrylate latex, UCAR 9192. The resulting ultra-high solid content polyurethane dispersion had a bimodal particle size and a very broad particle size distribution. The resulting ultra-high solid content polyurethane dispersion comprised 74.5 percent by weight of solid particles, excluding the weight of any filler, based on the total weight of the dispersion. The ultra-high solid content polyurethane dispersion had a viscosity of 2330 cps at 20 rpm at 21° C. using #4 spindle with Brookfield viscometer, and a viscosity of 1512 cps at 50 rpm at 21° C. using #4 spindle with Brookfield viscometer. The final ratio of urethane to acrylate was 0.28.

Example 6

The above described polyurethane prepolymer, Bioterge AS-40 (Sodium salt of alpha olefin sulfonate) as the surfactant, and water was fed into a mixer at a temperature of about 52° C., a polyurethane prepolymer to water ratio of 0.39. The surfactant comprised 2 percent by weight of solid, based on the total weight of the surfactant. Sufficient shear rate was provided to facilitate the formation of the ultra-high solid content polyurethane dispersion. The final dispersion comprised 64 percent by weight of solid, based on the total weight of the dispersion. The ultra-high solid content polyurethane dispersion had a viscosity of 3000 cps at 20 rpm at 28° C. using #3 spindle with Brookfield viscometer.

Example 7

A first polyurethane prepolymer, Bioterge AS-40 (Sodium salt of alpha olefin sulfonate) as the a surfactant, and water were fed into a first mixer under sufficient shear thereby forming a first stream. The surfactant comprised 2 percent by weight of solid, based on the total weight of the surfactant. A second polyurethane prepolymer, Bioterge AS-40 (Sodium salt of alpha olefin sulfonate) as the surfactant, and water were fed into a second mixer under sufficient shear thereby forming a second stream. The surfactant comprised 2 percent by weight of solid, based on the total weight of the surfactant. The first stream and second streams were fed into a third mixer and merged together under sufficient shear thereby forming the ultra-high solid content polyurethane dispersion of the instant invention. The final dispersion had a bimodal particle size distribution with 30 percent of the particles having an average volume particle size diameter of 0.3 to 3.0 micron, and 70 percent of the particles having an average volume particle size diameter of 1.5 micron. The ultra-high solid content polyurethane dispersion had a viscosity of 1951 cps at 20 rpm at 28° C. using #3 spindle with Brookfield viscometer.

Example 8

A first stream was produced according to the following procedure. A first alternative polyurethane prepolymer based on IPDI (Isophorone diisocyanate) and Tone 2241 was prepared using 17 percent by weight of IPDI, 80 percent by weight of Tone 2241(Caprolactone base polyester polyol having a molecular weight of 2000), 1.5 percent by weight of Carbowax 1000 (polyethylene oxide having a molecular weight of 1000) and 1.5 percent by weight of MPEG 950 (polyethylene glycol monol having a molecular weight of 950), based on weight of the first polyurethane prepolymer at about 90° C. for 8-9 hours. The resulting first alternative polyurethane prepolymer comprised 2.7 percent by weight of terminal NCO, based on the total weight of the first alternative polyurethane prepolymer. This first alternative polyurethane prepolymer was used as the first stream.

A second stream was produced according to the following procedure. A second alternative polyurethane prepolymer was prepared using 30 percent by weight of MDI(diphenylmethane-4,4'-diisocyanate), 56 percent by weight of Voranol 9287 and 2 percent by weight of MPEG 950. The resulting second alternative polyurethane prepolymer comprised approximately 6.9 percent by weight of terminal NCO, based on the weight of the second alternative polyurethane prepolymer. Subsequently, this second polyurethane prepolymer was emulsified using a high shear continuous dispersion process in the presence of an anionic surfactant, that is sodium dodecylbenzene sulfonate, and chain extended using Jeffamine D230 as the chain extender. The average particle size diameter of this first stream polyurethane dispersion was approximately 0.3 micron, and it comprised approximately 56 percent by weight of solid, excluding any additional fillers, based on the weight of the second stream polyurethane dispersion.

The first stream and the second stream were merged together in a mixer in different ratios thereby emulsifying the first stream into the second stream, and thereby producing the following inventive high-solid content polyurethane dispersions A-D, as shown in Table I.

Example 9

Sealant and caulk formulations using waterborne acrylic latex, shown as formulations a and b as the comparative formulations on Table II, and the inventive ultra-high solid content dispersion, shown as formulations c-e as the inventive formulations on Table II were prepared. These sealant/caulk formulations had a pigment (calcium carbonate) to polymer (acrylate or (urethane and acrylate)) ratio of 1.5. These acrylic based caulks were employed in caulking applications, and the results are also shown in Table II.

Example 10

High solids polyurethane/polyolefin hybrid dispersions were prepared via continuous mechanical dispersion process. The prepolymer composition comprised the followings: 21 grams of IPDI, 66.2 grams of Voranol 9287A (polyether polyol, 2000 molecular weight diol. 12.5% ethylene oxide capped), 8 grams of Carbowax 1000, 3 grams of polyethyleoxide monol (MPEG950), 4 grams of dipropylene glycol, and 8 grams of Voranol P425 (polyether polyol 425 Molecular weight diol). Final isocyanate % NCO was approximately 3.4 weight percent.

An ethylene-propylene based dispersion (POD), available from the Dow Chemical Company having 50.1% solid content and an average particle size of about 1 micron was used. An anionic surfactant neutralized with KOH at ~75% was used in the preparation of the ethylene-propylene based dispersion.

50 g of the prepolymer described above was continuously fed into 295 g of the ethylene-propylene based dispersion under high shear mixing (3000 rpm). Final dispersion had low viscosity (<1000 cps) and no residuals or coagulation. In the second experiment, 50 g of the prepolymer was fed into 186.2 g of the ethylene-propylene based dispersion under high shear. The final hybrid dispersion was a slightly thicker (<2000 cps) but still pourable and filterable. The ratios in these experiments were 75:25 POD:PUD and 65:35 POD:PUD, respectively. The solid contents of these final hybrid dispersions were 63, and 65 weight percent respectively.

Comparative Example A

A polyurethane dispersion having a monomodal particle size distribution having an average volume particle size diameter of 397 nm was prepared. The comparative dispersion comprised 64 percent by weight of solid, based on the total weight of the dispersion. Particle size distribution was not taken into consideration. The final dispersion had a very high viscosity of greater than 5000 cps at 20 rpm at 21° C. using spindle #3 with Brookfield viscometer The present invention may be embodied in other forms without departing from the spirit and the essential attributes thereof, and, accordingly, reference should be made to the appended claims, rather than to the foregoing specification, as indicating the scope of the invention.

Test Methods

Test methods include the following:

Volume average particle size diameter and particle size distribution were measured via Dynamic Light Scattering (Coulter LS 230).

Viscosity was measured via Brookfield viscometer.

Isocyanate content (percent NCO) was determined using a Meter Toledo DL58.

TABLE I

| Dispersion Sample No. | First Stream (weight in grams) | Second Stream (weight in grams) | Solid Content of the Dispersion (Weight Percent) | Viscosity (cps at 20 rpm at 21° C. using spindle #4 with Brookfield viscometer) |
| --- | --- | --- | --- | --- |
| A | 150 | 200 | 74.8 | <3000 |
| B | 125 | 200 | 73.0 | <3000 |
| C | 100 | 200 | 70.7 | <3000 |
| D | 20 | 200 | 60.0 | <3000 |

TABLE II

| Formulation No. | Formulation | Percent Shrinkage (%) (±1%) (Drying at ~21° C. and ~50% Humidity) |
|---|---|---|
| a | UCAR 169S | 25 |
| b | UCAR 163S | 28 |
| c | Dispersion of Example 1 | 22 |
| d | Dispersion of Example 2 | 20 |
| e | Dispersion of Example 3 | 17 |

We claim:

1. A continuous process for producing an Ultra-high solid content polyurethane dispersion comprising the steps of:
   providing a first stream, wherein said first stream comprises a first polyurethane prepolymer or a first polyurethane prepolymer emulsion;
   providing a second stream, wherein said second stream is a seed latex consisting of a polyolefin dispersion, wherein said seed latex has a volume average particle size diameter from 0.05 to 5.0 microns;
   continuously merging said first stream with said second stream in the presence of a chain extender and a surfactant, wherein the temperature is in the range of 10° C. to 70° C., the ratio of said first stream to said second stream is in the range of 0.1 to 0.6 and said surfactant is present in a concentration range of from 0.1 to 3% based on the total weight of said first stream, said second stream, and said surfactant;
   thereby forming said ultra-high solid content polyurethane dispersion comprising at least two volume average particle size diameters, the ultra-high solid content polyurethane dispersion having a particle size distribution in the range of 1:2 to 1:20 based on the percent volume of a first volume average particle size diameter to a second volume average particle size diameter, and wherein said ultra-high solid content polyurethane dispersion has at least a solid content of at least 70 percent by weight of said solid excluding the weight of any filler, based on the total weight of said ultra-high solid content polyurethane dispersion, and a viscosity of less than 3500 cps at 20 rpm at 21° C. using spindle #4 with Brookfield viscometer.

2. The continuous process for producing an ultra-high solid content polyurethane dispersion according to claim 1, wherein said first stream comprises first polymer resins and said second stream comprises second polymer resins, and wherein said first polymer resin and said second polymer resin have a volume average particle size ratio in the range of 1:5 to 1:2.

3. The continuous process for producing an ultra-high solid content polyurethane dispersion according to claim 2, wherein said first polymer resin and said second polymer resin have a volume average particle size ratio in the range of about 1:3.

4. The continuous process for producing an ultra-high solid content polyurethane dispersion according to claim 1, wherein said first stream comprises first polymer resins and said second stream comprises second polymer resins, and wherein said ultra-high solid content polyurethane dispersion comprises 20 to 40 percent by weight of said first polymer resins having a particle size in the range of 0.04 micron to 5.0 micron, and 60 to 80 percent by weight of said second polymer resins having a particle size in the range of 0.05 micron to 5.0 micron, based on the total weight of said first polymer resin and said second polymer resin.

5. The continuous process for producing an ultra-high solid content polyurethane dispersion according to claim 1, wherein said seed latex is an oil phase emulsified in water.

6. An ultra high solid content polyurethane dispersion prepared according to the continuous process of claim 1.

7. The continuous process for producing an ultra-high solid content polyurethane dispersion according to claim 1, wherein said first polyurethane prepolymer is a reaction product of at least one polyisocyanate and at least one polyol.

8. The continuous process for producing an ultra-high solid content polyurethane dispersion according to claim 7, wherein said polyisocyanate is aromatic or aliphatic.

9. The continuous process for producing an ultra-high solid content polyurethane dispersion according to claim 8, wherein said polyol is selected tom the group consisting of polyether, polyester, polycarbonate, natural seed oil polyol, and combinations thereof.

10. The continuous process for producing an ultra-high solid content polyurethane dispersion according to claim 9, wherein said first polyurethane prepolymer is ionic or nonionic.

11. The continuous process for producing an Ultra-high solid content polyurethane dispersion according to claim 6, wherein said first polyurethane prepolymer is isocyanate terminated or hydroxyl terminated.

12. A method for producing an article comprising the steps of:
   providing a first stream, wherein said first stream comprising a first polyurethane prepolymer or a first polyurethane prepolymer emulsion;
   providing a second stream, wherein second stream is a seed latex consisting of a polyolefin dispersion, wherein said seed latex has a volume average particle size diameter from 0.05 to 5.0 microns;
   continuously merging said first stream with said second stream in the presence of a chain extender and a surfactant, wherein the temperature is in the range of 10° C. to 70° C., the ratio of said first stream to said second stream is in the range of 0.1 to 0.6 and said surfactant is present in a concentration range of from 0.1 to 3% based on the total weight of said first stream, said second stream, and said surfactant;
   thereby forming said ultra-high solid content polyurethane dispersion, comprising at least two volume average particle size diameters, the ultra-high solid content polyurethane dispersion having a particle size distribution in the range of 1:2 to 1:20 based on the percent volume of a first volume average particle size diameter to a second volume average particle size diameter, and wherein said ultra-high solid content polyurethane dispersion has at least a solid content of at least 70 percent by weight of said solid excluding the weight of any filler, based on the total weight of said ultra-high solid content polyurethane dispersion, and a viscosity of less than 3500 cps at 20 rpm at 21° C. using spindle #4 with Brookfield viscometer;
   applying the dispersion to a substrate;
   drying the dispersion, and
   thereby forming the article.

13. A method for producing an article comprising the steps of:
   providing a first stream, wherein said first stream comprises a first polyurethane prepolymer or a first polyurethane prepolymer emulsion;
   providing a second stream, wherein said second stream is a seed latex consisting of a polyolefin dispersion, wherein said seed latex has a volume average particle size diameter from 0.05 to 5.0 microns;

continuously merging said first stream with said second stream in the presence of a chain extender and a surfactant, wherein the temperature is in the range of 10° C. to 70° C., the ratio of said first stream to said second stream is in the range of 0.1 to 0.6 and said surfactant is present in a concentration range of from 0.1 to 3% based on the total weight of said first stream, said second stream, and said surfactant;

thereby forming said ultra-high solid content polyurethane dispersion, comprising at least two volume average particle size diameters, the ultra-high solid content polyurethane dispersion having a particle size distribution in the range of 1.2 to 1:20 based on the percent volume of a first volume average particle size diameter to a second volume average particle size diameter, and wherein said ultra-high solid content polyurethane dispersion has at least a solid content of at least 70 percent by weight of said solid excluding the weight of any filler, based on the total weight of said ultra-high solid content polyurethane dispersion, and a viscosity of less than 3500 cps at 20 rpm at 21° C. using spindle #4 with Brookfield viscometer;

frothing the dispersion;

thereby forming a foam;

drying the foam; and thereby forming the article.

14. An article produced according to the method of either claim 12 or claim 13.

* * * * *